US 8,833,947 B2

(12) United States Patent
Kido et al.

(10) Patent No.: US 8,833,947 B2
(45) Date of Patent: Sep. 16, 2014

(54) DISPLAY APPARATUS AND DRIVING METHOD OF THE SAME

(75) Inventors: Katsuhiro Kido, Kanagawa (JP); Hideki Onuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 2003 days.

(21) Appl. No.: 11/835,714

(22) Filed: Aug. 8, 2007

(65) Prior Publication Data

US 2009/0027572 A1  Jan. 29, 2009

(30) Foreign Application Priority Data

Aug. 21, 2006  (JP) ................ P2006-224768

(51) Int. Cl.
*G03B 21/14* (2006.01)
*H04N 9/31* (2006.01)
*G02B 5/00* (2006.01)

(52) U.S. Cl.
CPC .............. *H04N 9/3197* (2013.01); *G02B 5/005* (2013.01); *H04N 9/3182* (2013.01); *H04N 9/3155* (2013.01)
USPC .............................................. 353/97; 353/88

(58) Field of Classification Search
CPC .................................................. G03B 21/2053
USPC ................. 353/85, 88, 89, 90, 91, 92, 93, 97; 396/216, 235
See application file for complete search history.

(56) References Cited

U.S. PATENT DOCUMENTS

| 4,124,283 | A  | * | 11/1978 | Shigeru et al. .............. 352/91 C |
| 4,456,349 | A  | * | 6/1984  | Hirata et al. ................ 352/91 C |
| 5,597,223 | A  | * | 1/1997  | Watanabe et al. ............... 353/97 |
| 6,769,777 | B1 | * | 8/2004  | Dubin et al. .................... 353/97 |
| 6,857,751 | B2 | * | 2/2005  | Penn et al. ...................... 353/97 |
| 7,093,941 | B2 | * | 8/2006  | Kawashima et al. ........... 353/97 |
| 2002/0154415 | A1 | * | 10/2002 | Miyauchi et al. ............ 359/676 |
| 2004/0119950 | A1 | * | 6/2004  | Penn et al. ...................... 353/97 |
| 2006/0077283 | A1 |   | 4/2006  | Sasazaki et al. |

FOREIGN PATENT DOCUMENTS

| JP | 2000-347112 | 12/2000 |
| JP | 2002-31846  | 1/2002  |
| JP | 2005-107009 | 4/2005  |
| JP | 2006-133750 | 5/2006  |

* cited by examiner

*Primary Examiner* — Francis M Legasse, Jr.
*Assistant Examiner* — Bao-Luan Le
(74) *Attorney, Agent, or Firm* — Oblon, Spivak, McClelland, Maier & Neustadt, L.L.P.

(57) ABSTRACT

A display apparatus includes a variable aperture stop device, a control circuit and a user interface. The variable aperture stop device is operable to adjust the lens opening size by opening and closing an aperture. The control circuit is operable to control the opening and closing of the aperture based on an aperture ratio for the brightness distribution of an input signal constituting a screen. The user interface permits to set times necessary for the opening and closing of the aperture. The control circuit controls the opening and closing of the aperture based on times set via the user interface so that the response to the opening and closing of the aperture differs between when the signal changes from dark to light levels and when the level changes from light to dark levels.

17 Claims, 12 Drawing Sheets

APERTURE OFF (FULLY OPEN: NO LIGHT BLOCKED)

APERTURE ON (50% OF LIGHT BLOCKED, FIXED MODE)

F I G . 6
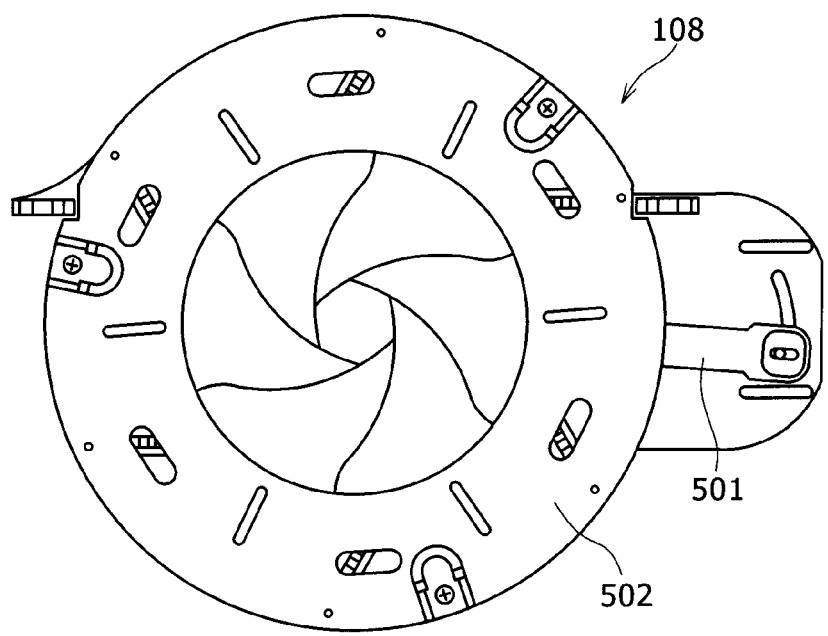
APERTURE ON (FULLY CLOSED: 80% OF LIGHT BLOCKED)

FIG.12

| | OPEN → CLOSE DARK ADAPTATION TIME | CLOSE → OPEN LIGHT ADAPTATION TIME |
|---|---|---|
| RECOMMENDED | ABOUT 1.5 SECONDS | ABOUT 0.5 SECONDS |
| FAST | ABOUT 1.0 SECONDS | ABOUT 0.3 SECONDS |
| SLOW | ABOUT 3.5 SECONDS | ABOUT 1.0 SECONDS |

DISPLAY APPARATUS AND DRIVING METHOD OF THE SAME

CROSS REFERENCES TO RELATED APPLICATIONS

The present invention contains subject matter related to Japanese Patent Application JP 2006-224768 filed with the Japan Patent Office on Aug. 21, 2006, the entire contents of which being incorporated herein by reference.

BACKGROUND OF THE INVENTION

1. Field of the Invention

The present invention relates to a display apparatus for displaying an image based, for example, on a video signal such as liquid crystal projector and a driving method of the same.

2. Description of the Related Art

A liquid crystal projector is a projector apparatus using spatial light modulators (hereinafter referred to as liquid crystal panels) which include a liquid crystal material. The liquid crystal panels of a liquid crystal projector do not emit light themselves.

In a liquid crystal projector, therefore, the liquid crystal panels are used in combination with a light source to irradiate light, thus illuminating the panels.

Then video signals are applied to the liquid crystal panels. The images formed by the liquid crystal panels are projected onto the screen by a projection lens.

A liquid crystal projector configured as described above can provide a compact and highly efficient projector apparatus.

Incidentally, some liquid crystal materials have the property to change the polarization of an incident beam (polarimetric property) according to the electric field applied. Many liquid crystal panels take advantage of this property to perform optical modulation. Therefore, a polarizing plate has to be provided on the incident side of the liquid crystal panel so that a unidirectional linear polarization (p- or s-polarization) is incident on the panel. A beam emerges from the liquid crystal panel after having undergone rotation of its polarization direction according to a video signal applied to the panel. A modulated beam based on the video signal can be obtained by allowing the polarization in a specific direction to pass through a polarizing plate. Therefore, a polarizing plate is provided as an analyzer on the emergent side of the liquid crystal panel for optical modulation.

On the other hand, a projector has been proposed which has the aperture on/off mode switching function so as to provide an easy-to-see display screen according to the environmental conditions in which the screen is installed. Further, a projector has been proposed which automatically controls the aperture opening diameter (refer, for example, to Japanese Patent Laid-Open No. 2006-133750).

SUMMARY OF THE INVENTION

However, a projector with the aperture on/off mode switching function is limited in terms of performance.

Further, the speed at which the aperture opening of the aperture stop device (iris) is varied is fixed in auto mode. Further, the variation speed parameter setting of the electrical correction circuit associated with the aperture stop device is also fixed. Thus users had no freedom of choice.

Light and dark adaptations vary from one individual to another. Light adaptation is a time necessary for human eyes to adjust to changes from dark to light images. Dark adaptation, which is the reverse of light adaptation, is a time necessary for human eyes to adjust to changes from light to dark images. Therefore, a recommended setting alone has not been sufficient to accommodate such differences between individuals.

It is a desire of the present invention to provide a display apparatus and a driving method of the same capable of reducing the impact, on visual effects, of variations in adaptation time of human eyes between individuals to changes over time in video brightness, so as to provide highly impressive images which are natural-looking to all viewers.

A display apparatus according to a first embodiment of the present invention includes a variable aperture stop device, a control circuit operable to control the opening and closing of the aperture based on an aperture ratio for the brightness distribution of an input signal constituting a screen, and a user interface permitting to set times necessary for the opening and closing of the aperture. The control circuit controls the opening and closing of the aperture based on times set via the user interface so that the response to the opening and closing of the aperture differs between when the signal changes from dark to light levels and when the level changes from light to dark levels.

A display apparatus according to a second embodiment of the present invention includes a variable aperture stop device, a control circuit operable to control the opening and closing of the aperture based on an aperture ratio for the brightness distribution of an input signal constituting a screen, a user interface permitting to set times necessary for the opening and closing of the aperture, and a signal correction unit capable of correcting a gain of a signal adapted to drive an image to be displayed. The control circuit controls the opening and closing of the aperture based on times set via the user interface so that the response to the opening and closing of the aperture differs between when the signal changes from dark to light levels and when the level changes from light to dark levels. Further, the control circuit corrects the gain in accordance with the aperture opening and closing control using the signal correction unit.

A display apparatus according to a third embodiment of the present invention includes a variable aperture stop device and a brightness detection unit operable to sample a brightness distribution of all pixels of an input signal at a plurality of points and detect, as a point X, a point at the luminance level occupying an area of the brightness distribution which accounts for a preset ratio to an area occupied by total pixel count. The display apparatus further includes a signal correction unit capable of correcting a gain of a signal adapted to drive an image to be displayed, and a control circuit operable to control the opening and closing of the aperture based on an aperture ratio for the point X detected by the brightness detection unit and also operable to correct the gain based on data for the point X using the signal correction unit. The control circuit controls the opening and closing of the aperture based on preset times so that the response to the opening and closing of the aperture differs between when the signal changes from dark to light levels and when the level changes from light to dark levels. Further, the control circuit corrects the gain in accordance with the aperture opening and closing control using the signal correction unit.

A display apparatus according to a fourth embodiment of the present invention includes an optical modulation unit operable to modulate an incident illumination beam based on an input image signal and emit a modulated beam, a variable aperture stop device operable to open and close in a concentric manner relative to the optical axis of the beam from the optical modulation unit so as to adjust the amount of the incident illumination beam upon the optical modulation unit based on a control signal. The display apparatus further includes a control circuit operable to control the opening and closing of the aperture based on an aperture ratio for the brightness distribution of an input signal constituting a screen, and a user interface permitting to set times required for the opening and closing of the aperture. The control circuit controls the opening and closing of the aperture based on times set via the user interface so that the response to the opening and closing of the aperture differs between when the signal changes from dark to light levels and when the level changes from light to dark levels.

A display apparatus according to a fifth embodiment of the present invention includes an optical modulation unit operable to modulate an incident illumination beam based on an input image signal and emit a modulated beam, a variable aperture stop device operable to open and close in a concentric manner relative to the optical axis of the beam from the optical modulation unit so as to adjust the amount of the incident illumination beam upon the optical modulation unit based on a control signal. The display apparatus further includes a control circuit operable to control the opening and closing of the aperture based on an aperture ratio for the brightness distribution of an input signal constituting a screen, and a user interface permitting to set times required for the opening and closing of the aperture. The display apparatus still further includes a signal correction unit capable of correcting a gain of a signal adapted to drive an image to be displayed. The control circuit controls the opening and closing of the aperture based on times set via the user interface so that the response to the opening and closing of the aperture differs between when the signal changes from dark to light levels and when the level changes from light to dark levels. Further, the control circuit corrects the gain in accordance with the aperture opening and closing control using the signal correction unit.

A display apparatus according to a sixth embodiment of the present invention includes an optical modulation unit operable to modulate an incident illumination beam based on an input image signal and emit a modulated beam, a variable aperture stop device operable to open and close in a concentric manner relative to the optical axis of the beam from the optical modulation unit so as to adjust the amount of the incident illumination beam upon the optical modulation unit based on a control signal. The display apparatus further includes a brightness detection unit operable to sample a brightness distribution of all pixels of an input signal at a plurality of points and detect, as a point X, a point at the luminance level occupying an area of the brightness distribution which accounts for a preset ratio to an area occupied by total pixel count. The display apparatus still further includes a signal correction unit capable of correcting a gain of a signal adapted to drive an image to be displayed, and a control circuit operable to control the opening and closing of the aperture based on an aperture ratio for the point X detected by the brightness detection unit and also operable to correct the gain based on data for the point X using the signal correction unit. The control circuit controls the opening and closing of the aperture based on preset times so that the response to the opening and closing of the aperture differs between when the signal changes from dark to light levels and when the level changes from light to dark levels. Further, the control circuit corrects the gain in accordance with the aperture opening and closing control using the signal correction unit.

A seventh embodiment of the present invention is a driving method of a display apparatus having a variable aperture stop device. The driving method includes the steps of setting times necessary for the opening and closing of the aperture via a user interface, and acquiring a brightness distribution of an input signal constituting a screen. The driving method further includes the step of controlling the opening and closing of the aperture based on times set via a user interface so that the response to the opening and closing of the aperture differs between when the signal changes from dark to light levels and when the level changes from light to dark levels. The driving method still further includes the step of correcting a gain of a signal adapted to drive an image to be displayed in accordance with the aperture opening and closing control.

According to the present embodiment, for example, the control circuit controls the opening and closing of the aperture based on the times set via the user interface so that the response to the opening and closing of the aperture differs between when the signal changes from dark to light levels and when the level changes from light to dark levels. In parallel therewith, the control circuit corrects the gain in accordance with the aperture opening and closing control using the signal correction unit.

According to the present embodiment, it is possible to reduce the impact, on visual effects, of variations in adaptation time of human eyes between individuals to changes over time in video brightness, thus providing highly impressive images which are natural-looking to all viewers.

BRIEF DESCRIPTION OF THE DRAWINGS

FIG. 6 is a view illustrating the aperture stop device according to the present embodiment when the aperture is on (fully closed: 80% of light blocked);

FIG. 12 is a view illustrating an application example of times necessary to vary the iris aperture diameter from the closing end to the opening end in light and dark adaptations;

DETAILED DESCRIPTION OF THE PREFERRED EMBODIMENTS

The preferred embodiment of the present invention will be described below with reference to the accompanying drawings.

Figure 1:
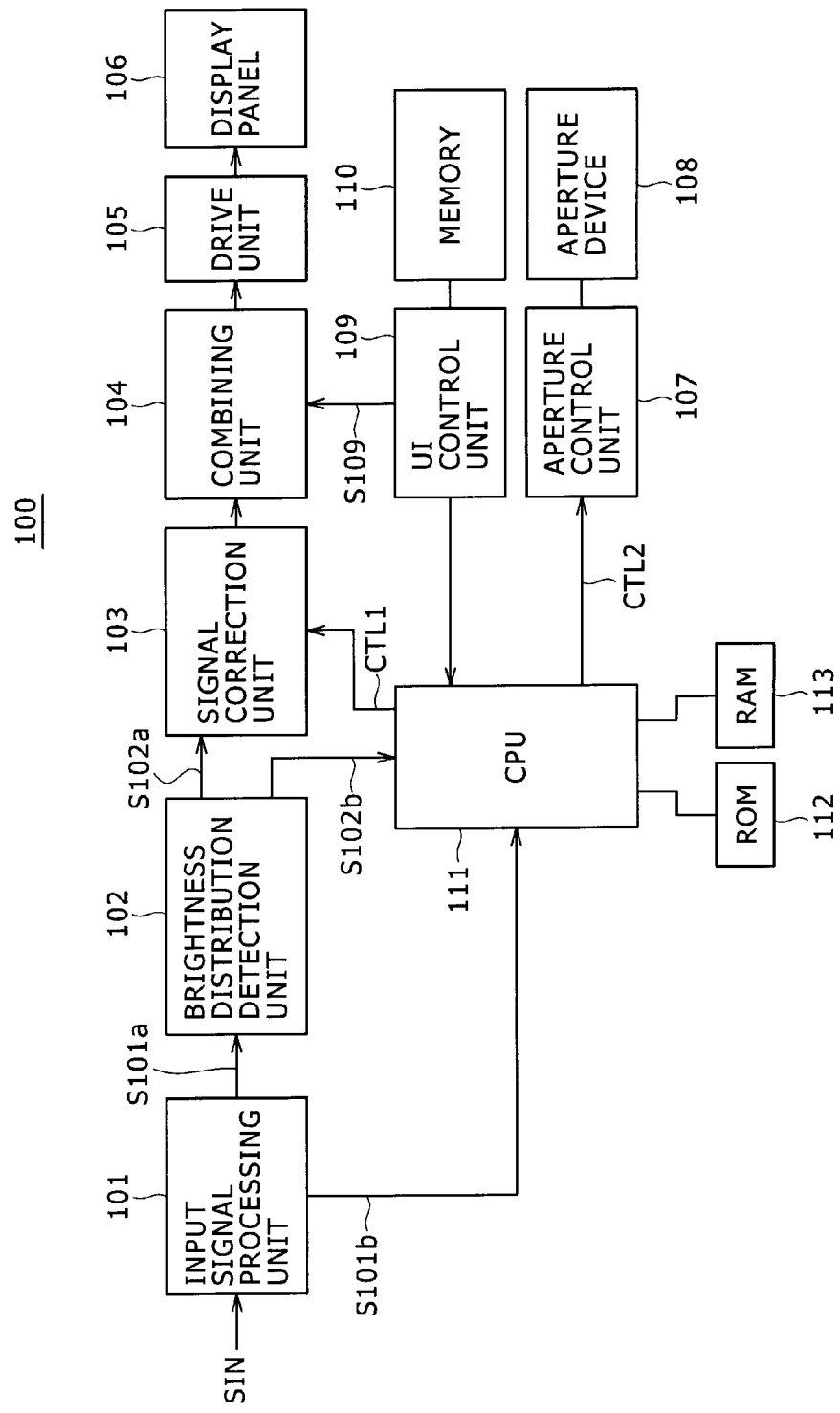
FIG. 1 is a block configuration diagram illustrating an embodiment of a signal processing system of a display apparatus according to an embodiment of the present invention.

FIG. 1 is a block configuration diagram illustrating an embodiment of a signal processing system of a display apparatus according to an embodiment of the present invention.

A display apparatus 100 according to the present embodiment is applied, for example, to a liquid crystal projector. The display apparatus 100 has the aperture stop device (iris) on/off switching function and the aperture auto adjustment function so as to render the display image easier to see according to the environmental conditions in which the screen is installed.

As shown in FIG. 1, the display apparatus 100 has an input signal processing unit 101, a brightness distribution detection unit 102, a signal correction unit 103, a combining unit 104, a drive unit 105, and a display panel 106 such as liquid crystal display panel (LCD). The display apparatus 100 further has an aperture control unit 107, an aperture stop device 108, a user interface (hereinafter UI) control unit 109, a memory 110 accessed by the UI control unit 109, a CPU 111 serving as a control circuit, and ROM 112 and RAM 113 accessed by the CPU 111.

In the display apparatus 100 according to the present embodiment, if the aperture auto adjustment function is applied, the signal level (gain) adapted to drive the aperture opening and a display panel 16 is controlled.

If the luminance distribution is biased toward dark areas, for example, as in the case of a video signal input of a dark screen, the aperture opening is reduced to restrict optical output so that black becomes more inconspicuous. On the other hand, the signal level adapted to drive the display panel 16 is conversely raised to increase the contrast. This allows an image to be displayed at a preset gradation level.

By performing the above control, the display panel 106 can make use of a wider displayable dynamic range, thus providing an excellent representation of gradations even in a dark picture. On the other hand, if the display panel 16 is a liquid crystal panel, reducing the aperture opening reduces the angle of luminous flux incident upon the liquid crystal panel, thus providing improved incidence angle characteristic (viewing angle dependence) and ensuring enhanced contrast.

The CPU 111 of the display apparatus 100 essentially controls the opening and closing of the aperture so that the response to the opening and closing of the aperture differs between when the signal changes from dark to light levels and when the level changes from light to dark levels. Further, the CPU 111 corrects the gain in accordance with the aperture opening and closing control using the signal correction unit 103. To accomplish this, the CPU 111 issues an instruction to the aperture control unit 107 to control the aperture stop device 108 so that the response speed to the opening and closing of the aperture is faster when the signal changes from dark to light levels than when the level changes from light to dark levels. Further, the CPU 111 issues an instruction to the signal correction unit 103 to correct the signal level (gain) adapted to drive the display panel 16 in accordance with the aperture opening and closing control.

The display apparatus 100 of the present embodiment is configured so that, in aperture stop device (iris) auto adjustment mode, choices of the speed at which to vary the lens aperture diameter of the aperture stop device (iris) 108 and the variation speed parameter of the signal correction unit 103, which is an electrical correction circuit associated with the aperture stop device, are made available to users via a UI (user interface). This reduces the impact, on visual effects, of variations in adaptation time of human eyes between individuals to changes over time in video brightness, thus allowing all viewers to enjoy impressive images through the advanced iris effect.

The input signal processing unit 101 converts an input signal SIN of various types into a predetermined format (e.g., RGB signal) and outputs it to the brightness distribution detection unit 102 as a signal S101a. The input signal SIN includes a video signal reproduced by a DVD player or other device, a signal decoded by a television tuner, a component video signal, a composite video signal and RGB signal.

On the other hand, the input signal processing unit 101 has the decoding function. The same unit 101 extracts the details of input video signal (e.g., information indicating a sports program or movie) and content information such as input frequency from program information of the input video signal and outputs the extracted information to the CPU 111 as a signal 101b.

After receiving the video signal S101a from the input signal processing unit 101, the brightness distribution detection unit 102 detects the luminance distribution from the brightness information. From the detected distribution, the same unit 102 detects a point X at which the area occupied by the luminance distribution exceeds a predetermined value (e.g., 95%). Then the same unit 102 outputs the detection result to the CPU 111 as a signal S102.

The detection process handled by the brightness distribution detection unit 102 is carried out at intervals of at least once every 10V (vertical signal cycle) at the timing of a vertical synchronizing signal VSYNC of an input video signal.

Further, the same unit 102 outputs the video signal S101a from the input signal processing unit 101 to the signal correction unit 103 as a signal S102a.

The signal correction unit 103 performs adjustments (image processing) of the output signal S102 from the brightness distribution detection unit 102, including color conversion, gamma adjustment and sharpness adjustment. Then the same unit 103 outputs the resultant signal to the combining unit 104 as a signal S103.

The signal correction unit 103 is given a gain (contrast) control value by the CPU 111 as a control signal CTL1. The same unit 103 uses a gain value from the control signal CTL1 to correct (adjust) the signal level and outputs the resultant signal to the combining unit 104.

A description will be made later about the detection process handled by the brightness distribution detection unit 102, the process handled by the signal correction unit 103 of the CPU 111 and control of the aperture stop device 108.

The combining unit 104 outputs the signal S103 from the signal correction unit 103 to the drive unit 105. Further, when supplied with UI display image data by the UI control unit 109, for example, the combining unit 104 combines the signal S103 from the signal correction unit 103 with the UI display image data and supplies the resultant signal to the drive unit 105.

The drive unit 105 generates a signal necessary to drive the display panel 106 based on the output signal from the combining unit 104. The same unit 105 also performs other processes including accommodating variations of the display panel 106. The drive unit 105 varies in configuration according to the device of the display panel 106.

The display panel 106 displays an image based on the input video signal as it is driven by the drive unit 105. Alternatively, the display panel 106 displays a UI display image together with an image based on the input video signal.

The aperture control unit 107 controls the opening and closing of the aperture stop device 108 according to a control signal CTL2 from the CPU 111.

If, from the control signal CTL2 from the CPU 111 based on the brightness distribution information of the video signal, the luminance distribution is biased toward dark areas, for example, as in the case of a video signal input of a dark screen, the aperture control unit 107 controls the aperture stop device 108 to reduce the aperture opening (aperture ratio). This restricts optical output, causing black to become more inconspicuous.

On the other hand, if, from the control signal CTL2 from the CPU 111 based on the brightness distribution information of the video signal, the luminance distribution is not biased toward dark areas, for example, as in the case of a video signal input of a standard or light screen, the aperture control unit 107 controls the aperture stop device 108 to enlarge the aperture opening (aperture ratio).

As described above, the aperture control unit 107 controls the opening and closing of the aperture stop device 108 to continuously vary the aperture opening diameter so as to achieve the optimal diameter. The aperture control unit 107 controls the aperture stop device 108 so that the illumination F number is maximum on the black. Further, the same unit 107 controls the aperture stop device 108 so that the illumination F number is minimum, and the aperture ratio is 100% on the white.

The aperture control unit 107 has a digital/analog converter (DAC) and an analog/digital converter (ADC). The same unit 107 varies the aperture opening diameter in a stepless manner by controlling an output voltage (0 to Vcc±0.3V) VCTL from the DAC.

Further, the aperture control unit 107 is capable of acquiring aperture position information by receiving, via the ADC, a Hall device output HOUT. The Hall device output HOUT is an output voltage of a Hall device of a galvanometer in the aperture stop device 108.

As described later, the aperture stop device 108 is disposed at an approximately intermediate position between first and second microlens arrays (MLAs) of an illumination optical device of the liquid crystal projector. The aperture stop device 108 opens and closes in a concentric manner based on the control voltage VCTL received from the aperture control unit 107 in response to the control signal CTL2 from the CPU 111.

The aperture stop device 108 is constructed so that the aperture ratio does not drop to 0%.

The aperture stop device 108 has six or more aperture blades of identical shape. These aperture blades are opened and closed synchronously. The blades have a luster plated finish and a protrusion on the surface to allow for point contact where the blades overlap each other.

The aperture stop device 108 is constructed to allow fitting, in a thermally insulated manner, of a driving actuator operable to drive the blades so as to open and close the blades, and a blade opening position detection sensor. The driving actuator is disposed on the emergent side relative to a light source unit.

Further, the aperture stop device 108 is configured not to use the stroke limits of the actuator (mechanical end positions).

Still further, the aperture stop device 108 is disposed near a light source. For this reason, the same device 108 is constructed to forcefully cool not only the driving actuator but also the illuminated blades and their peripheral portions of the aperture stop device.

Figure 2:
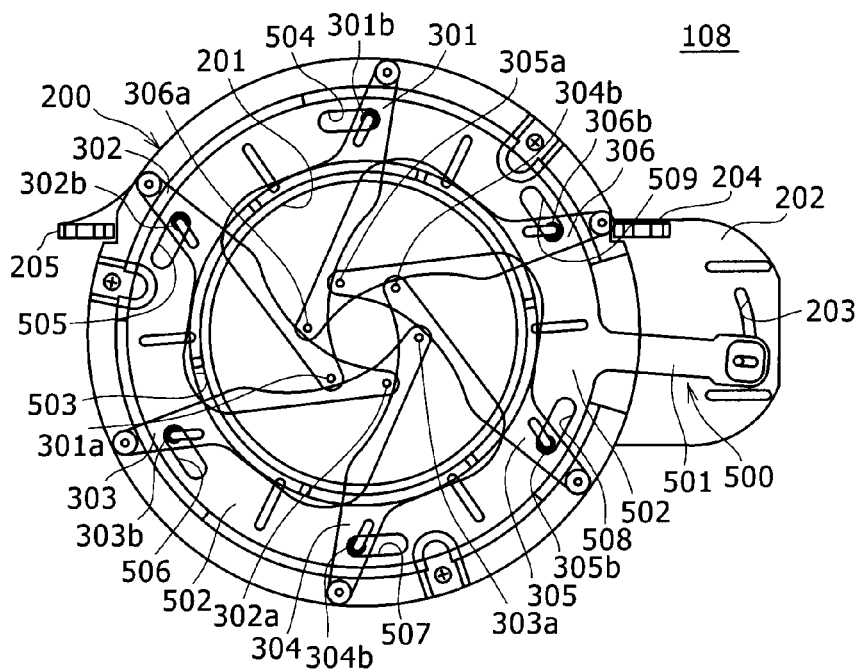
FIG. 2 is a front view illustrating a configuration example of an aperture stop device according to the present embodiment.
Figure 3:
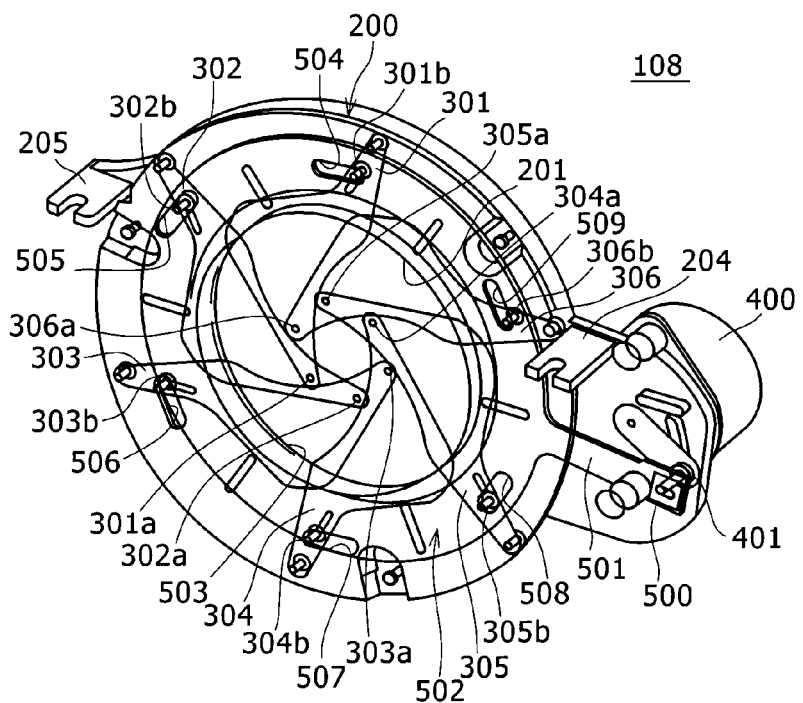
FIG. 3 is a perspective view illustrating a configuration example of the aperture stop device according to the present embodiment.

FIG. 2 is a front view illustrating a configuration example of the aperture stop device according to the present embodiment. FIG. 3 is a perspective view illustrating a configuration example of the aperture stop device according to the present embodiment.

The aperture stop device 108 has an opening portion 201, adapted to open in a circular manner, formed at a central portion thereof. The same device 108 further has a main body portion 200 formed by PPS or other heat-resistant resin and a plurality of aperture blades (six blades in the present embodiment) 301 to 306 whose one end is rotatably fitted to the outer peripheral portion on one side of the main body portion 200 (front side in the figure which is the incident side of an illumination beam L). The same device 108 still further has a galvanometer 400 fitted to a fitting portion 202 on the emergent side of the illumination light of the main body portion 200. The fitting portion 202 is extended at an approximately central portion on the right of the main body portion 200 in the figure. The galvanometer 400 is a driving actuator and has a first swing arm 401 fitted to a rotating shaft thereof. The same device 108 still further has a second swing arm 500. One end of the second swing arm 500 is fitted to the first swing arm 401 on the incident side of the illumination light L of the main body portion 200 through a restricting portion 203. The restricting portion 203 is a hole in the form of a circular arc formed on the fitting portion 202 of the main body portion 200.

Further, screw fastening pieces 204 and 205 are extended on the front side (incident side of the illumination light L) at the approximately central portion of the main body portion 200 in the figure. The screw fastening pieces 204 and 205 come in contact with the enclosure to be fitted as the aperture stop device 108 is inserted in a predetermined position, thus allowing for screw fastening at that position. Further, the optical axis of the aperture stop device 108 and that of the optical device described later are roughly aligned with each other when the pieces 204 and 205 are simply brought into contact with the enclosure to be fitted.

The vicinities of the other end portions of the aperture blades 301 to 306 (end portions which can be positioned inside the opening portion 201) have areas which overlap each other. In these areas, protruding portions 301a to 306a are formed so as to allow for point contact between the adjacent aperture blades. The above arrangement ensures reduced frictional resistance during opening and closing of the blades, thus allowing for smooth opening and closing thereof.

Further, guided shafts 301b to 306b are formed at one ends (vicinity side of the rotating shaft) of the aperture blades 301 to 306.

The second swing arm 500 has a linear fitted portion 501 whose one end portion is fitted to the first swing arm 401. The second swing arm 500 also has a circular portion 502 which is formed in a circular shape at the other end of the fitted portion 501. The second swing arm 500 is formed, for example, by sheet-metal working.

In the circular portion 502 of the second swing arm 500, a circular opening portion 503 is formed which is slightly larger in diameter than the opening portion 201 of the main body portion 200. The second swing arm 500 is fitted to the main body portion 200 in such a manner that the opening portion 503 is roughly aligned with the opening portion 201 of the main body portion 200 and that the second swing arm 500 is horizontally movable within a predetermined range in FIG. 2. In this case, the diameter of the circular opening portion 503 is set so that the opening portion 201 of the main body portion 200 is not blocked by the second swing arm 500 as the arm 500 moves horizontally.

In the circular portion 502, a plurality of oblong holes (six holes in the present embodiment) 504 to 509 are formed in a circumferential direction. The guided shafts 301b to 306b are locked into the oblong holes 504 to 509. The guided shafts 301b to 306b are formed at predetermined positions of the aperture blades 301 to 306, and more specifically at positions suited for the positions of the oblong holes 504 to 509, with the second swing arm 500 fitted to the main body portion 200. As a result, as the galvanometer 400 is driven, the first swing arm 401 rotates within a predetermined range. As the first swing arm 401 moves, the second swing arm 500 moves horizontally within the predetermined range in the figure. This causes the guided shafts 301b to 306b of the aperture blades 301 to 306 to be guided respectively in the oblong holes 504 to 509 of the second swing arm 500, thus allowing the aperture blades 301 to 306 to open and close.

The aperture stop device 108 is designed and manufactured so that the center of the outer diameter thereof is aligned with the center of the opening of the aperture blades 301 to 306.

The aperture stop device 108 is installed and fastened between the first and second MLAs so that the optical axis of an illumination light source unit is aligned with the central axis of the aperture stop device 108.

An aperture stop device housing unit of the illumination optical unit is constructed so that when the outer diameter of the aperture stop device 108 is housed therein as a guide, the center of the optical axis of the illumination light source unit is aligned with the center of the opening of the aperture stop device 108 without any positioning.

The first swing arm 401 is fastened to an output shaft of the galvanometer 400. The first swing arm 401 swings as a galvanometer shaft swingingly rotates.

A drive pin is fastened to the tip portion of the first swing arm 401. The pin is locked into the slide guide groove (restricting portion 203) of the second swing arm 500.

The second swing arm 500 is guided via the first swing arm 401 along the rotating direction guides (oblong holes 504 to 509) formed in the main body portion 200 so as to be rotatable around the center of the illumination optical axis.

Locking pins are disposed and fastened to the second swing arm 500 in a circumferential direction to synchronously open and close the blades of the aperture stop device.

The output shaft of the galvanometer 400 is mechanically connected to the aperture blades. As a control voltage is applied to the galvanometer 400 to obtain a predetermined aperture opening, a displacement is transferred from the output shaft of the galvanometer to the aperture blades via the first and second swing arms. This provides a desired size of the aperture opening according to the control voltage level from the aperture control unit 107.

The aperture stop device 108 of the present embodiment blocks about 80% to 70% of light rather than 100% even when fully closed.

The minimum aperture opening diameter is determined assuming the uniformity within a target tolerance and system problems including fumes and flames resulting from excessive temperature rise of the blade surfaces. As the aperture opening diameter diminishes, the so-called overlapping effect of integrator optics weakens, resulting in more likelihood of non-uniform light intensity distribution between cell lenses in the liquid crystal panel.

The aperture opening diameter will be described next.

Figure 4:
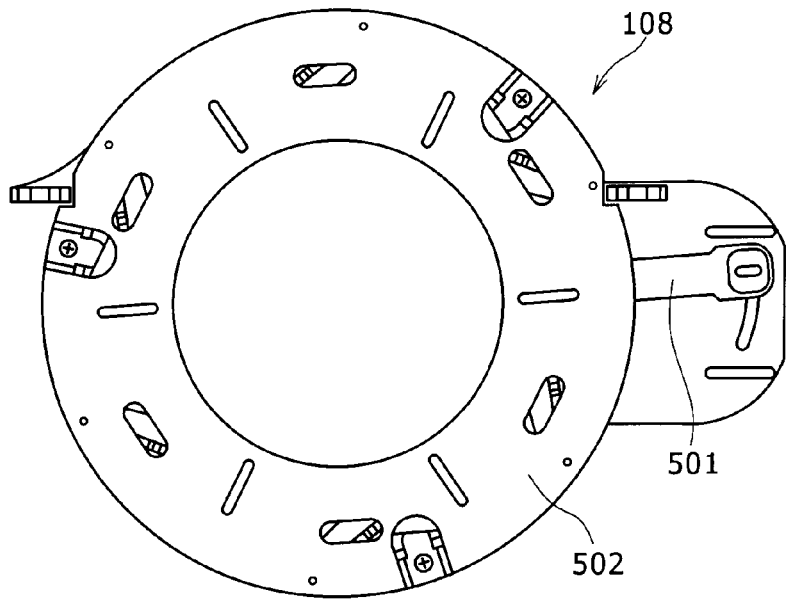
FIG. 4 is a view illustrating the aperture stop device according to the present embodiment when an aperture is off (fully open: no light blocked)
Figure 5:
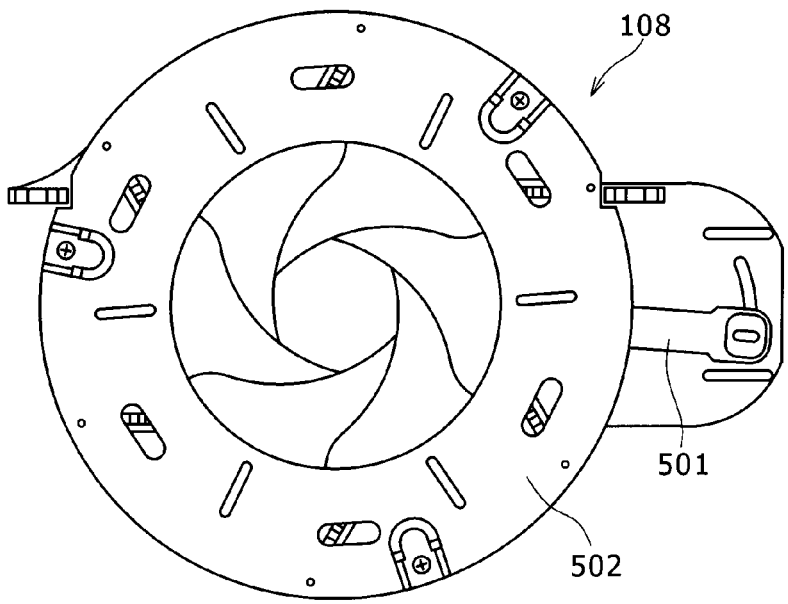
FIG. 5 is a view illustrating the aperture stop device according to the present embodiment when the aperture is on (fixed mode: 50% of light blocked)

FIG. 4 is a view illustrating the aperture stop device according to the present embodiment when the aperture is off (fully open: no light blocked). FIG. 5 is a view illustrating the aperture stop device according to the present embodiment when the aperture is on (fixed mode: 50% of light blocked). FIG. 6 is a view illustrating the aperture stop device according to the present embodiment when the aperture is on (fully closed: 80% of light blocked).

Upon receiving an instruction from a user using a remote control device, which is not shown in any of the above figures, to set the response characteristic of the aperture stop device (iris), the UI control unit 109 performs various processes on the UI display image data stored in the memory 110. Such processes include pixel count conversion which converts the signal to fit to the size of the display panel 106 and addition of a graphical instruction region (OSD) of the GUI. Then the UI control unit 109 outputs the resultant signal to the combining unit 104.

Upon receiving an instruction, for example, from a remote control device to set the response characteristic, the UI control unit 109 informs the CPU 111 thereof.

Further, when the iris response characteristic is set and the setting is finalized, the UI control unit 109 informs the CPU 111 thereof.

In response to a detection signal S102b from the brightness distribution detection unit 102, the CPU 111 controls the opening and closing of the aperture so that the response to the opening and closing of the aperture differs between when the signal changes from dark to light levels and when the level changes from light to dark levels. Further, the CPU 111 corrects the gain in accordance with the aperture opening and closing control using the signal correction unit 103.

To accomplish this, the CPU 111 issues an instruction to the aperture control unit 107 to control the aperture stop device 108 so that the response speed to the opening and closing of the aperture is faster when the signal changes from dark to light levels than when the level changes from light to dark levels. Further, the CPU 111 issues an instruction to the signal correction unit 103 to correct the signal level (gain) adapted to drive the display panel 16 in accordance with the aperture opening and closing control.

The CPU 111 controls the opening and closing of the aperture based on times suited for the information stored in the ROM 112 or the iris response characteristic setting which is set, for example, via the UI control unit 109.

Upon receiving the detection signal S102b from the brightness distribution detection unit 102, the CPU 111 calculates an aperture ratio from a detection value indicated by the detection signal S102b. The CPU 111 outputs the control signal CTL2 to the aperture control unit 107 to control the opening and closing of the aperture stop device 108 based on this aperture ratio. Further, the CPU 111 selects a proper gain level from the gain curve table for the gamma ($\gamma$) correction curve stored in the ROM 112 by taking the reciprocal of the obtained aperture ratio. Then the CPU 111 outputs this gain level to the signal correction unit 103 as the control signal CTL1.

If the luminance distribution is biased toward dark areas, for example, as in the case of a video signal input of a dark screen, the CPU 111 outputs the control signal CTL2 to the aperture control unit 107 so as to control the aperture stop device 108 to reduce the aperture opening (aperture ratio). This restricts optical output, thus causing black to become more inconspicuous.

If the luminance distribution is not biased toward dark areas, for example, as in the case of a video signal input of a standard or light screen, the CPU 111 outputs the control signal CTL2 to the aperture control unit 107 so as to control the aperture stop device 108 to enlarge the aperture opening (increase the aperture ratio).

Figures 7A, 7B:
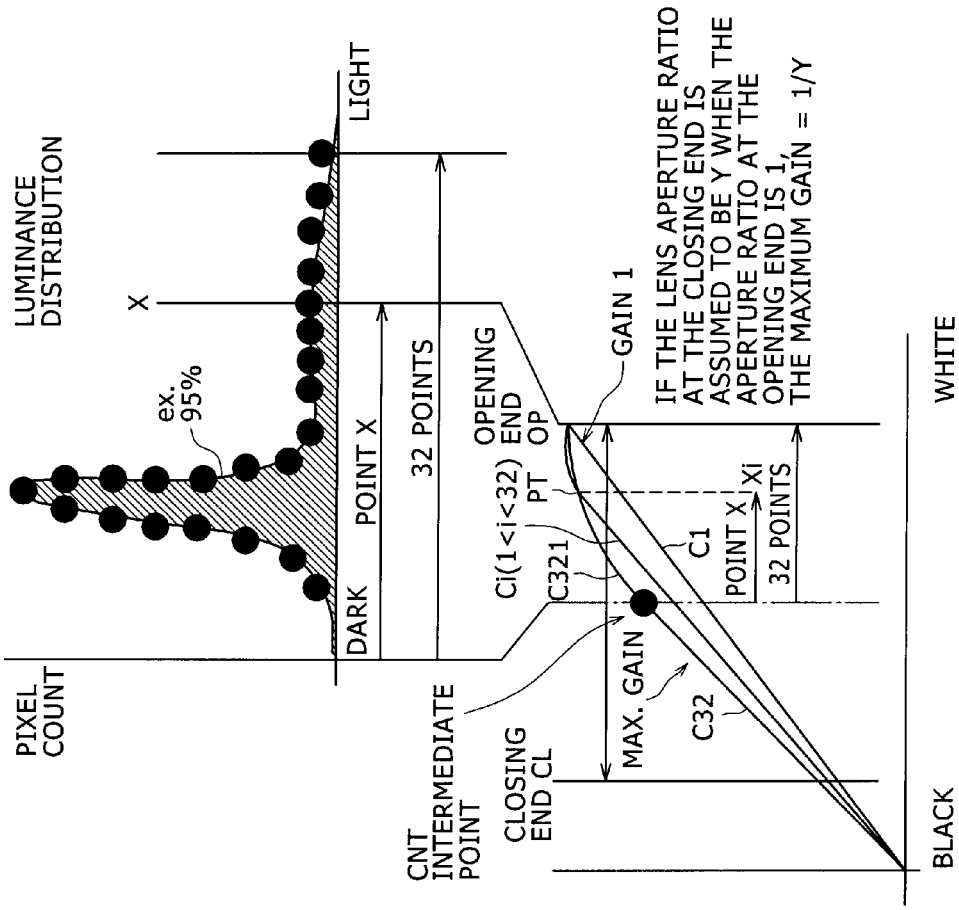
FIGS. 7A and 7B are views illustrating the relationship between luminance distribution detection, gamma level correction and optical aperture control according to the present embodiment.

FIGS. 7A and 7B are views illustrating the relationship between luminance distribution detection, gamma level correction and optical aperture control according to the present embodiment.

As shown in FIG. 7A, the brightness distribution detection unit 102 samples the luminance of each pixel at 32 points serving as discrimination points adapted to identify, for example, the luminance (gradation) level to find the luminance distribution of all pixels. Then the brightness distribution detection unit 102 determines, as the point X, a point on the luminance level which occupies, for example, 95% of the area (pixel count) from the dark level in the luminance distribution when the total pixel count is assumed to be 100%.

The ROM 112 stores a gain curve table suited for the iris gamma correction curve illustrated in FIG. 7B. Based on the point X value given by the brightness distribution detection unit 102, the CPU 111 selects table data X in which the slope of the gamma correction curve is set to a gain of any of 1 to 32, with 1 being the minimum.

Table data for a characteristic curve C1 of a gain 1 is set as X1. Similarly, table data for a characteristic curve C32 of the maximum gain is set as X32. Between these two pieces of data, table data X2 to X31 are set for characteristic curves C2 to C31.

Gain 1 is the minimum gain level. This level assumes that the aperture ratio of the aperture stop device 108 is 1 at the opening end. That is, the aperture stop device 108 is fully open. The gamma correction curve is C1, and the table data is X1.

A maximum gain Gmax is as follows if the aperture ratio of the aperture stop device 108 at the closing end is assumed to be Y when the aperture ratio thereof at the opening end is 1:

$$G\max = 1/Y \quad \text{[Formula I]}$$

As illustrated in FIG. 7B, the correction curve C32 with the maximum gain changes linearly up to an intermediate point CNT between a closing end CL and an opening end OP. From the intermediate point CNT to the opening end OP, the curve C32 transforms into a quadratic curve C321.

A curve Ci ($1 \leq i \leq 32$) of the point X changes linearly up to an intersection point PT with the curve C32 having the maximum gain. From the intersection point PT to the opening end OP, the curve C32 similarly transforms into a quadratic curve.

When the point X is determined, the CPU 111 follows the above procedure to determine the gamma correction curve Ci and the lens aperture ratio of the iris as well. Until these target values are reached, the displacement of the aperture opening will take place at a rate specified by the iris response parameter which is set through the UI.

A more specific description of the UI will be made later after a description of the relationship between luminance distribution detection, gamma level correction and optical aperture control.

Further, the CPU 111 permits setting of three adjustment modes as the automatic aperture adjustment functions for the aperture stop device 108, namely, auto 1 (Auto1), auto 2 (Auto2) and manual modes.

Figure 8:
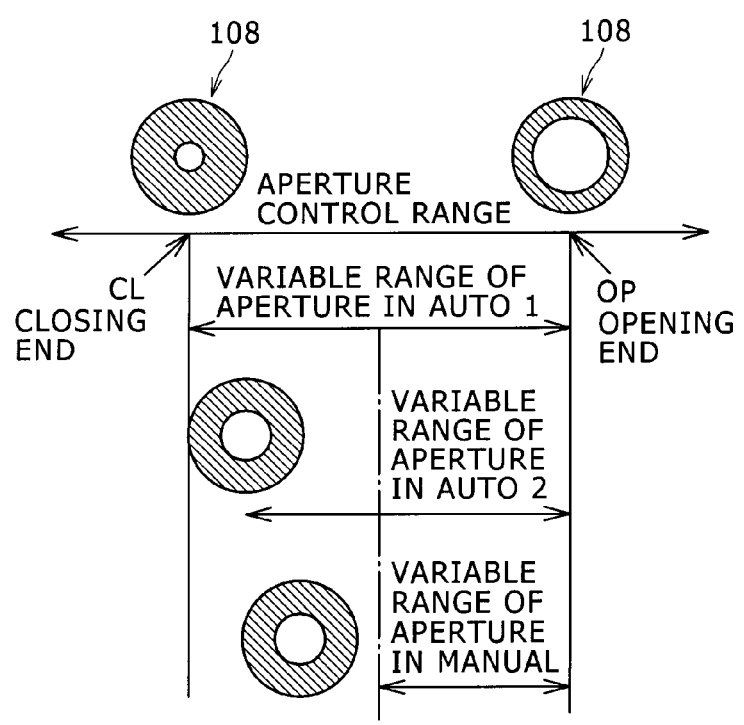
FIG. 8 is a view illustrating the relationship between the aperture adjustment range of an aperture stop device (iris) and the movable range of an iris aperture diameter in auto 1, auto 2 and manual modes.

FIG. 8 is a view illustrating the relationship between the aperture adjustment range of the aperture stop device (iris) and the movable range of the iris aperture diameter in auto 1, auto 2 and manual modes.

In auto 1 (Auto1) mode, the movable range is largest of all modes, spanning from the closing end CL to the opening end OP. This mode provides dynamic contrast control in response to scene changes. In this case, the aperture ratio is about 32% at the closing end CL and 100% at the opening end OP.

In auto 2 (Auto2) mode, the movable range is smaller as compared to that in auto 1 (Auto1) mode, thus providing more natural-looking contrast control in response to scene changes.

In manual mode, on the other hand, the iris diameter can be fixed at a desired position from the intermediate point between the closing end CL and the opening end OP to the opening end OP. In this case, the CPU 111 does not perform optical aperture control of the aperture stop device 108 or gamma correction curve through luminance distribution detection.

Here, a description will be made about the operations of luminance distribution detection, gamma level correction and optical aperture control with reference to FIG. 9.

<Step ST1>

A video signal from the input signal processing unit 101 is fed to the brightness distribution detection unit 102 where the luminance distribution is detected (ST1).

As illustrated in FIG. 7A, the luminance distribution is expressed by pixel count versus luminance. The point X is detected at which the area occupied by the luminance distribution (integral of the luminance distribution from 0 to the given point X) exceeds a predetermined percentage (e.g., 95%). The detection process is carried out at intervals of at least once every 10V (vertical signal cycle) at the timing of a vertical synchronizing signal input.

<Step ST2>

The CPU 111 performs control in accordance with the point X value. The CPU 111 calculates the aperture ratio based on the point X value and outputs the control signal CTL2 to the aperture control unit 107 to control the opening and closing in accordance with this aperture ratio. The CPU 111 selects a proper gain level from the gain curve table for the gamma (γ) correction curve, for example, stored in the ROM 112 by taking the reciprocal of the obtained aperture ratio. Then the CPU 111 outputs this gain level to the signal correction unit 103 as the control signal CTL1.

<Steps ST3 and ST4>

If the control signal CTL2 from the CPU 111 based on the brightness distribution information of the video signal indicates that the luminance distribution is biased toward dark areas, for example, as in the case of a video signal input of a dark screen, the aperture control unit 107 controls the aperture stop device 108 to reduce the aperture opening (aperture ratio). This restricts optical output, thus causing black to become more inconspicuous.

If the control signal CTL2 from the CPU 111 based on the brightness distribution information of the video signal indicates that the luminance distribution is not biased toward dark areas, for example, as in the case of a video signal input of a standard or light screen, the aperture control unit 107 controls the aperture stop device 108 to enlarge the aperture opening (increase the aperture ratio).

<Step ST5>

The signal correction unit 103 is given a gain (contrast) control value by the CPU 111 as the control signal CTL1. The same unit 103 uses the gain value from the control signal CTL1 to electrically correct (adjust) the gamma level of the signal.

Figure 9:
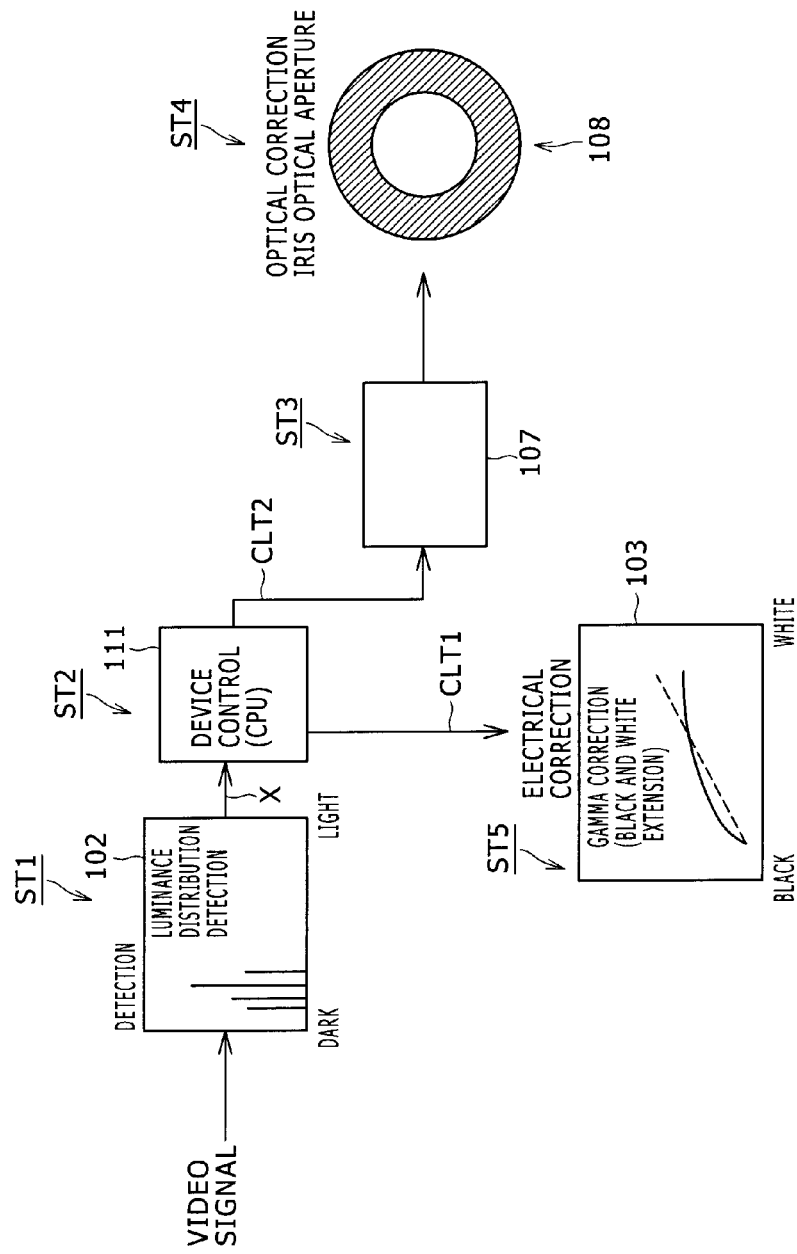
FIG. 9 is a view describing the operations of luminance distribution detection, gamma level correction and optical aperture control.

In the example of FIG. 9, the luminance distribution is biased toward dark areas. Therefore, the luminance is normalized to 0 to 1. For example, if the point X is 0.8, the iris aperture ratio is 0.8 in the processes performed in steps ST3 and ST4.

At this time, a gamma correction curve table according to the process in step ST5 is set so that the gain is 1/0.8=1.25.

Qualitatively, if it is found in the process of step ST1 that the luminance distribution is biased toward dark areas, the aperture control unit 107 reduces the iris opening in steps ST3 and ST4 to reduce the brightness so that black becomes more inconspicuous.

On the other hand, the control performed by the CPU 111 in step ST2 changes the gamma correction curve in the process of step ST5, causing the contrast to increase.

The UI of the present embodiment will be described next.

If, for example, the user issues an instruction to set the response characteristic of the aperture stop device (iris) using a remote control device which is not shown in any of the figures, the UI control unit 109 performs various processes of the UI display image data signal stored in the memory 110. Such processes include pixel count conversion which converts the signal to fit to the size of the display panel 106 and addition of a graphical instruction region (OSD) of the GUI. Then the UI control unit 109 outputs the resultant signal to the combining unit 104.

Then a list selection popup menu appears on the display panel 106 as an advanced iris function selection menu. The menu permits the selection of one of the following four options:

Off: Turns off the aperture function.

Auto 1: Auto aperture function (importance attached to contrast capability)

Auto 2: Auto aperture function (importance attached to natural-looking change in aperture)

Manual: Fixed aperture function

That is, the aperture off mode is selectable in addition to the three modes described in relation to FIG. 8, namely, auto 1, auto 2 and manual modes.

The auto 1 mode offers the advantage that the contrast performance can be improved by widening the aperture range. Therefore, the auto 1 mode is selected when importance is attached to the contrast performance. This mode is chosen, for example, when the contrast changes dynamically as in a sports program.

The auto 2 mode is characterized in that the aperture change can be made more natural-looking by narrowing the aperture range, in other words, the contrast changes less as compared to the auto 1 mode. Therefore, the auto 2 mode is selected when importance is attached to the natural-looking screen changes (natural-looking aperture changes). This mode is chosen, for example, for watching a movie in which the contrast changes less as compared to a sports program.

In the present embodiment, the automatic adjustment modes of the aperture stop device (iris) 108 are classified into two groups of auto 1 and auto 2. Thus users are free to choose between one mode in which priority is given to the contrast (auto 1) and another in which priority is given to natural-looking screen change.

If auto 1 or auto 2 is selected, another list selection popup menu appears as an iris response menu. The menu permits selection of one of the following three options:

Normal (recommended): Normal iris response

Fast: Fast iris response

Slow: Slow iris response

When watching a picture with significantly changing brightness as in a sport, one should select "Fast."

On the other hand, when watching a picture with slowly changing brightness as in a movie, one should select "Slow."

The setting information related to the iris response characteristic set via the UI is supplied to the CPU 111 from the UI control unit 109.

Figure 10:
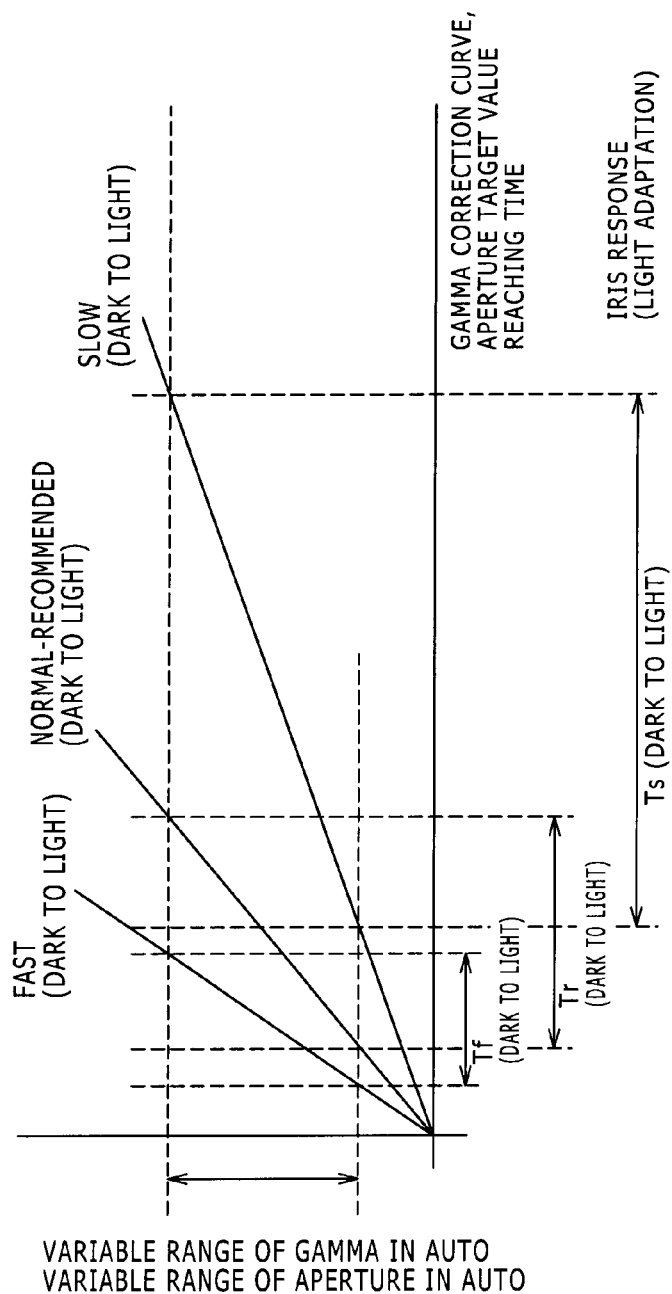
FIG. 10 is a view illustrating the effect of iris response in light adaptation by showing a gamma correction curve and an aperture target value reaching time versus variable ranges of the gamma curve and an aperture opening diameter with different iris response parameters.

FIG. 10 is a view illustrating the effect of iris response in light adaptation by showing the gamma correction curve and an aperture target value reaching time versus variable ranges of the gamma curve and the aperture opening diameter with different iris response parameters.

Figure 11:
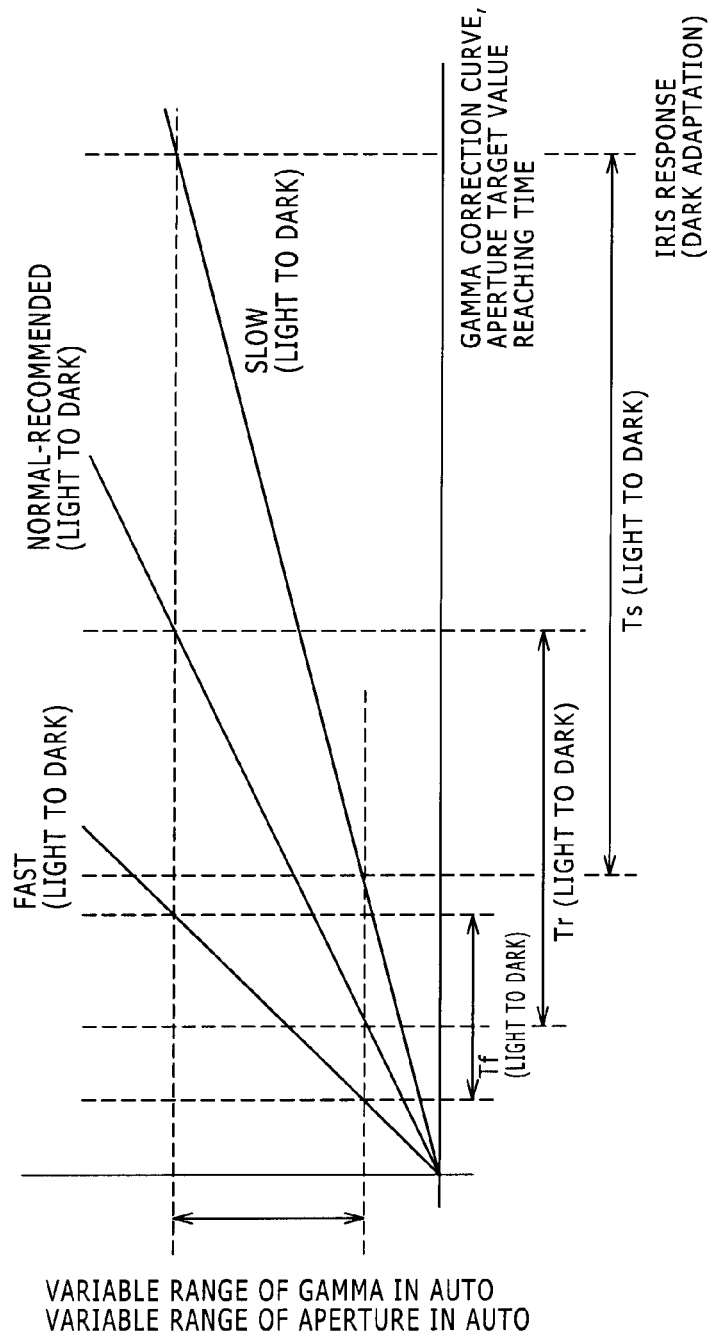
FIG. 11 is a view illustrating the effect of iris response in dark adaptation by showing the gamma correction curve and the aperture target value reaching time versus the variable ranges of the gamma curve and the aperture opening diameter with different iris response parameters.

Similarly, FIG. 11 is a view illustrating the effect of iris response in dark adaptation by showing the gamma correction curve and the aperture target value reaching time versus the variable ranges of the gamma curve and the aperture opening diameter with different iris response parameters.

The speed at which to vary the aperture diameter and the rate of change of the gamma correction curve for improved contrast are controlled as a pair by changing the iris response.

This control is carried out at intervals of every 1 V at the timing of a vertical synchronizing signal.

FIG. 12 is a view illustrating an application example of times necessary to vary the iris aperture diameter from the closing end to the opening end in light and dark adaptations.

With human eyes, dark adaptation time, which is a time necessary to adapt to changes from light to dark scenes, is typically longer than light adaptation time which is a time necessary to adapt to changes from dark to light scenes.

Besides, dark and light adaptation times are different between individuals. This individual difference in adaptation times is accommodated by three options, namely, Normal (recommended), Fast and Slow, selectable from the menu.

The iris response can be selected independently in auto 1 and auto 2 modes. Further, the selections are stored independently in the two modes. This offers a greater freedom of choice of the relationship between iris variation and adaptation time.

Referring to FIG. 12 in relation to FIGS. 10 and 11, when "Normal" (recommended) is selected, a light adaptation time Tr in FIG. 10 is 0.5 seconds, and a dark adaptation time Tr in FIG. 11 is 1.5 seconds.

Similarly, when "Fast" is selected, a light adaptation time Tf in FIG. 10 is 0.3 seconds, and a dark adaptation time Tf in FIG. 11 is 1.0 second.

When "Slow" is selected, a light adaptation time Ts in FIG. 10 is 1.0 second, and a dark adaptation time Ts in FIG. 11 is 3.5 seconds.

As described above, dark adaptation time, which is a time necessary to adapt to changes from light to dark scenes, is longer in all the above cases than light adaptation time which is a time necessary to adapt to changes from dark to light scenes.

In the present embodiment, the settings as illustrated in FIG. 12 are stored in the ROM 112. The CPU 111 corrects the gamma level and controls the optical aperture in accordance with the user-selected mode which is notified by the UI control unit 109 and also in accordance with the light and dark adaptation times stored in the ROM 112.

It is to be noted that, upon receiving a signal S101*b* from the input signal processing unit 101, the CPU 111 may passively select the auto 1 and 2 modes in accordance with the details of the input video signal (information indicating a sports program or movie) and content information such as input frequency.

As described above, the display apparatus according to the present embodiment includes the variable aperture stop device 108 and the brightness distribution detection unit 102 operable to sample the brightness distribution of all pixels of an input signal at a plurality of points and detect, as a point X, a point at the luminance level occupying an area of the brightness distribution which accounts for a preset ratio to an area occupied by total pixel count. The display apparatus further includes the UI control unit 109, the signal correction unit 103 capable of correcting a gain of a signal adapted to drive an image to be displayed, and the control circuit 111 operable to control the opening and closing of the aperture based on the aperture ratio for the point X detected by the brightness distribution detection unit 102 and also operable to correct the gain based on the data for the point X using the signal correction unit 103. The control circuit 111 controls the opening and closing of the aperture based on times set via the UI control unit 109 so that the response to the opening and closing of the aperture differs between when the signal changes from dark to light levels and when the level changes from light to dark levels. The control circuit 111 further corrects the gain in accordance with the aperture opening and closing control using the signal correction unit 103. Thus the following effect can be achieved.

Namely, the display apparatus allows control suited for light and dark adaptations of human eyes and also for the opening and closing of the aperture. This reduces the impact, on visual effects, of variations in adaptation time of human eyes to changes over time in video brightness, thus providing highly impressive images which are natural-looking to all viewers.

In other words, in iris auto adjustment modes, the choices of the speed at which to vary the lens aperture diameter of the iris and the variation speed parameter of the electrical correction circuit associated with the aperture stop device, are made available to users via the user interface. This reduces the impact, on visual effects, of variations in adaptation time of human eyes between individuals to changes over time in video brightness, thus allowing all viewers to enjoy impressive images through the advanced iris effect.

The display apparatus 100 having the aforementioned characteristics is, for example, applicable to a liquid crystal projector.

Figure 13:
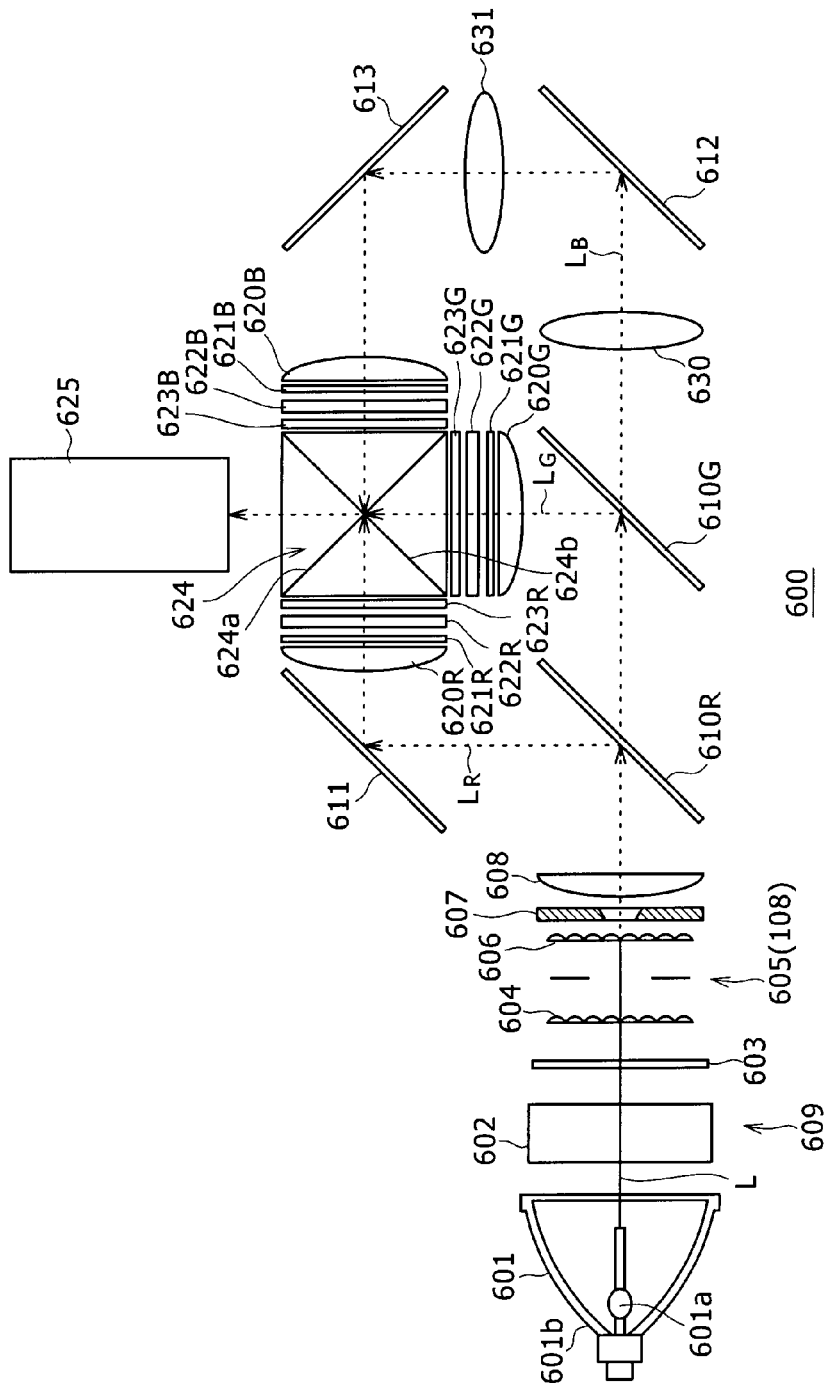
FIG. 13 is a view illustrating the operating principle of an embodiment of a liquid crystal projector (projection display apparatus) using a display apparatus according to an embodiment of the present invention.
Figure 14:
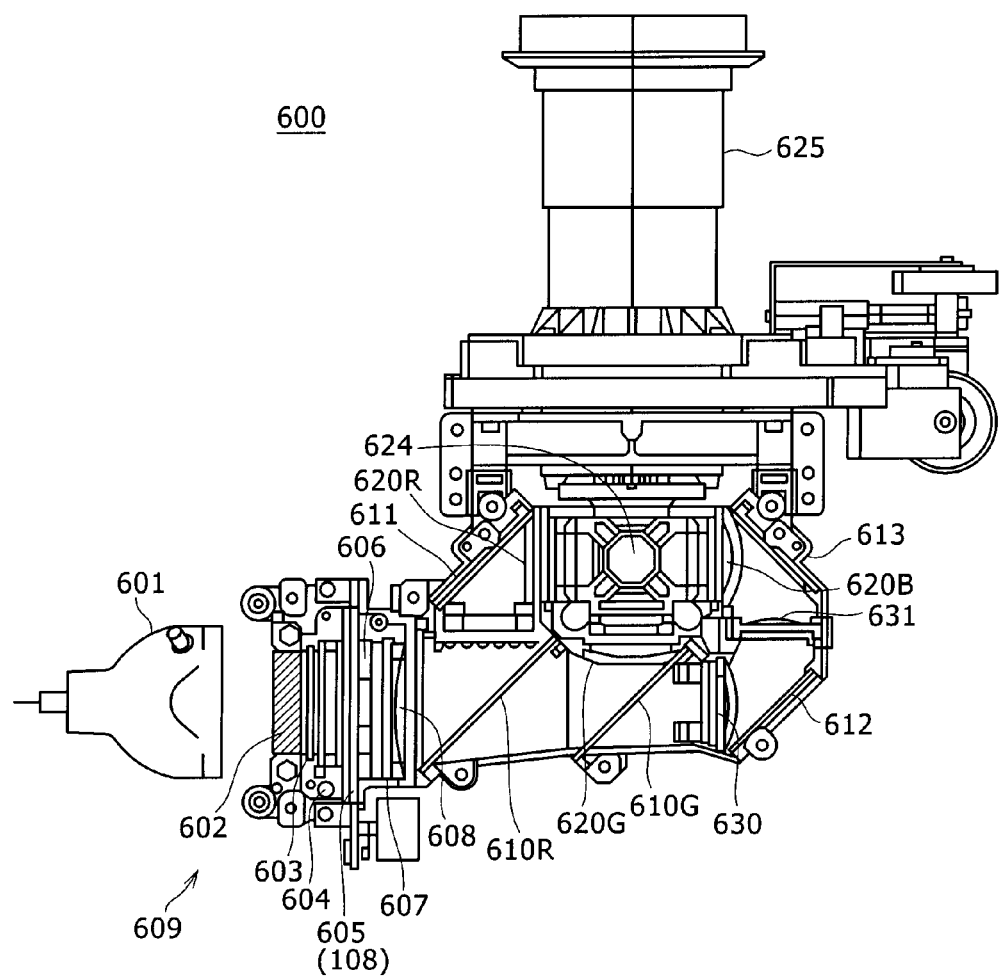
FIG. 14 is a view illustrating the liquid crystal projector (projection display apparatus) as implemented using the display apparatus according to the embodiment of the present invention.

FIG. 13 is a view illustrating the operating principle of an embodiment of a liquid crystal projector (projection display apparatus) using the display apparatus according to the embodiment of the present invention. FIG. 14 is a view illustrating the liquid crystal projector (projection display apparatus) as implemented using the display apparatus according to the embodiment of the present invention.

As illustrated in FIGS. 13 and 14, a liquid crystal projector 600 includes a light source unit 601, a collimator lens 602, an optical filter 603, a first microlens array (MLA) 604, an aperture stop device 605 and a second MLA 606. The liquid crystal projector 600 further includes a polarization conversion device 607, a condenser lens 608, dichroic mirrors 610R and 610G, reflecting mirrors 611, 612 and 613, condenser lenses 620R, 620G and 620B, polarizing plates 621R, 621G and 621B, liquid crystal panels 622R, 622G and 622B, polarizing plates 623R, 623G and 623B, a dichroic prism 624, a projection optics 625 and relay lenses 630 and 631. An illumination optical device 609 includes the light source unit 601, the collimator lens 602, the optical filter 603, the first MLA 604, the aperture stop device 605, the second MLA 606, the polarization conversion device 607 and the condenser lens 608.

The aperture stop device 605, which is a characteristic of the present invention, is configured in a similar manner as the aperture stop device 108 of the display apparatus 100 described above. The aperture stop device 605 is disposed halfway along the optical path between the first and second MLAs 604 and 606, and more specifically, approximately at the central portion between the first and second MLAs 604 and 606. The same device 605 is a variable illumination aperture stop device operable to open and close in a concentric manner relative to the optical axis (solid line shown as the illumination beam L).

The aperture stop device 605 configured as described above is characterized as follows.

The aperture stop device 605 is disposed at an approximately intermediate position between the first and second MLAs 604 and 606 of the illumination optical device 609. To ensure that the aperture opening is close to circular, the aperture blades are of identical shape.

The aperture opening forms a shape closest to a true circle when the aperture diameter is smallest.

In the present embodiment, six has been selected as the optimal number of the aperture blades 301 to 306.

<Optimal Number of the Aperture Blades: Six>

A smaller number of blades will make the aperture noncircular, thus impairing uniformity in light intensity distribution of illumination on the liquid crystal panels.

The number of blades has to be selected that can make the shape of the aperture opening closest to a true circle with change in opening diameter. Seven or more blades will result in higher cost and increased complexity of the system adapted to compensate for increased frictional resistance during driving.

Six blades are effective in increasing the F number of light beam collected onto the liquid crystal panels. This number ensures reduced angular component of the incident beam upon each of the cells of the liquid crystal panels, thus providing improved polarization efficiency and thereby enhanced contrast.

The aperture stop device 605 is not disposed adjacent to the surface of the first MLA 604. The reason for this is that the first MLA 604 has an approximately conjugate relationship with the liquid crystal panels. Therefore, if the illumination intensity of the beam from the light source which has passed through cells near the border with the edge of the aperture opening of the aperture blades 301 to 306 is uneven across the surfaces of the cells, reduced uniformity will result when the beam forms an image on the liquid crystal panels.

The aperture stop device 605 is not disposed adjacent to the surface of the second MLA 606. The beam from the light source which has passed through each of the cell lenses of the first MLA 604 is collected onto the appropriate cell lens on the surface of the second MLA. As a result, the illumination intensity is discrete on the surface of the second MLA 606. With the aperture stop device having a single opening centered on the lamp light source unit 601, the relationship between the opening diameter and the light intensity through the aperture exhibits a distribution in a sawtooth form, thus resulting in poorer linearity.

From the above, a test was conducted in relation to the installation location of the aperture stop device 605. It was discovered that the optimal uniformity and linear change in light intensity were obtained when the aperture stop device 605 was installed approximately equidistantly from the first and second MLAs 604 and 606.

The lamp of the light source is constantly lit. Therefore, when 100% of light is blocked, optical energy from the lamp light source which has passed through the first MLA 604 all reaches the aperture blades 301 to 306. This leads to a significant temperature rise of the blade surfaces as a result of thermal absorption. Even if the forced cooling of the aperture stop device stops in the event of a system failure, part of the beam from the light source (the illumination beam L) passes through the aperture stop device. This prevents the blades from becoming excessively hot.

Further, the aperture stop device 605 uses a galvanometer rather than a stepping motor as a driving device.

The components and functions of the liquid crystal projector 600 will be described below.

The light source unit 601 includes a discharge lamp 601a and a reflection condenser mirror 601b. The beam from the discharge lamp 601a is collected by the reflection condenser mirror 601b. Then the same mirror 601b emits the beam toward the collimator lens 602.

The collimator lens 602 converts the illumination beam L from the light source unit 601 into a parallel flux and emits it to the optical filter 603.

The optical filter 603 removes undesired beam in the infrared and ultraviolet regions from the illumination beam L emitted from the light source unit 601 via the collimator lens 602.

The first MLA 604 splits the illumination beam L from the light source unit 601 into a plurality of beams and lays outs the optical images thereof in the vicinity of the incident side of the second MLA 606.

More specifically, the first MLA 604 has a plurality of lenses laid out in an array form. The first MLA 604 splits the illumination beam L into a plurality of images and collects the split images. Then the same MLA 604 lays out the beam spots of the split images at predetermined positions (in the vicinity of the second MLA 606).

The aperture stop device 605 is disposed at an approximately intermediate position between and equidistantly from the first and second MLAs 604 and 606 of the illumination optical device 609. The aperture stop device 605 opens and closes in a concentric manner relative to the optical axis.

The aperture stop device 605 is controlled to continuously vary the aperture ratio according to the mean brightness level of the video signal so that the aperture ratio is large when the brightness level is high and that the aperture ratio is small when the brightness level is low.

The aperture stop device 605 is controlled so that the illumination F number is maximum on the black.

Further, the aperture stop device 605 is controlled so that the illumination F number is minimum, and the aperture ratio is 100% on the white.

The aperture stop device 605 is constructed so that the aperture ratio does not drop to 0%.

The aperture stop device 605 has six or more aperture blades of identical shape which synchronously open and close. The blades have a luster plated finish and a protrusion on the surface to allow for point contact where the blades overlap each other.

Further, the aperture stop device 605 is constructed to allow fitting, in a thermally insulated manner, of a driving actuator and a blade opening position detection sensor. The driving actuator is disposed on the emergent side relative to the light source unit 601.

Still further, the aperture stop device 605 is constructed to forcefully cool the driving actuator as well as the illuminated blades and their peripheral portions of the aperture stop device.

Still further, the aperture stop device 605 is configured not to use the stroke limits of the actuator (mechanical end positions).

The second MLA 606 causes the split light source images from the first MLA 604 to enter the polarization conversion device 607 so that the images can enter the liquid crystal panels 622R, 622G and 622B as illumination beams.

The second MLA 606 has a plurality of lenses laid out for a plurality of beam spots collected by the first MLA 604. These lenses superpose and combine the split images from the first MLA 604 and emit the combined image.

The polarization conversion device 607 includes, for example, polarization splitters arranged in the form of strips, and phase difference plates provided intermittently for the polarization splitters. The same device 607 converts the p-polarization components of the incident illumination beams L into s-polarization components. Thus, the same device 607 outputs the illumination beams which include many s-polarization components as a whole and are aligned with each other in polarization direction.

The condenser lens 608 collects the illumination beams L which have passed through the polarization conversion device 607 so that the beams overlap with each other on the liquid crystal panels 622R, 622G and 622B.

The dichroic mirror 610R is inclined 45 degrees relative to the optical axis of the illumination beam L which has passed through the condenser lens 608 and which is aligned in polarization direction. Of the illumination beam L, the dichroic mirror 610R reflects only a beam LR in the red wavelength region toward the reflecting mirror 611 and permits passage of a beam LGB in other wavelength region.

The reflecting mirror 611 is inclined 45 degrees relative to the optical axis of the beam LR reflected by the dichroic mirror 610R. The reflecting mirror 611 reflects the beam LR toward the condenser lens 620R.

The dichroic mirror 610G is inclined 45 degrees relative to the optical axis of the beam LGB which has passed through the dichroic mirror 610R. Of the beam LGB which has passed through the dichroic mirror 610R, the dichroic mirror 610G reflects only a beam LG in the green wavelength region toward the condenser lens 620G and permits passage of a beam LB in other wavelength region (blue wavelength region).

The relay lenses 630 and 631 are provided to reform an image of the beam LB in the blue wavelength region halfway along the optical path of the beam LB. The reason for this is that the optical path thereof is relatively long, extending from the dichroic mirror 610G to the liquid crystal panel 622B.

After passing through the dichroic mirror 610G, the blue beam LB passes through the relay lenses 630 and 631. Then the blue beam is reflected by the reflecting mirror 613 toward the condenser lens 620G.

The condenser lenses 620R, 620G and 620B and the liquid crystal panels 622R, 622G and 622B are provided respectively at predetermined positions relative to three surfaces of the cubic dichroic prism 624.

Further, on the incident and emergent sides of the liquid crystal panels 622R, 622G and 622B are provided the polarizing plates 621R, 621G and 621B which serve as polarizers, and the polarizing plates 623R, 623G and 623B which serve as analyzers. These polarizing plates are arranged respectively in parallel with the liquid crystal panels.

The polarizing plates 621R, 621G and 621B are fastened respectively on the emergent sides of the condenser lenses 620R, 620G and 620B. The polarizing plates 623R, 623G and 623B are fastened to three incident surfaces of the dichroic prism 624.

The liquid crystal panels 622R, 622G and 622B modulate the intensities of the incident red, green and blue beams LR, LG and LB entering the panels via the condenser lenses 620R, 620G and 620B according to video signals applied which are associated with three primary colors.

Namely, after passing through the polarizing plates 621R, 621G and 621B, the color beams LR, LG and LB in predetermined polarization directions undergo rotation of their polarization planes based on the video signals applied to the liquid crystal panels 622R, 622G and 622B.

The polarization components of the beams with rotated polarization planes enter the dichroic prism 624 after passing through the polarizing plates 623R, 623G and 623B.

The dichroic prism 624 includes, for example, a plurality of glass prisms joined together. Each glass prism has interference filters 624a and 624b formed on its junction surface.

The interference filter 624a reflects the blue beam LB and permits passage of the red and green beams LR and LG. The interference filter 624b reflects the red beam LR and permits passage of the green and blue beams LG and LB. Therefore, the respective color beams LR, LG and LB modulated by the liquid crystal panels 622R, 622G and 622B are combined and enter the projection optics 625.

The projection optics 625 projects the video beam from the dichroic prism 624 onto a projection surface such as a screen. A color picture appears on the screen.

In a liquid crystal projector as described above, it is also possible to perform control appropriate for light and dark adaptations of human eyes and also appropriate for the opening and closing of the aperture. This reduces the impact, on visual effects, of variations in adaptation time of human eyes between individuals to changes over time in video brightness, thus providing highly impressive images which are natural-looking to all viewers.

Further, when installed at a predetermined position, the illumination aperture stop device according to the present embodiment provides significantly improved contrast ratio to the picture projected onto the screen without changing the optical design of ordinary illumination optics.

Increase in volume occupied by the illumination optics resulting from the installation of the present aperture stop device occurs only at the peripheral area around where the device is installed. This ensures significantly improved performance without impairing the marketability. Further higher contrast ratio can be expected by controlling the aperture stop device so that the illumination F number is maximum on the black.

It is to be noted that, in the above embodiment, a case was described in which the signal level, adapted to drive the aperture opening and the display panel 106, is controlled based on the brightness distribution information of the video signals when the aperture auto adjustment function is applied. However, the present invention is also applicable when only the aperture opening is controlled based on the brightness distribution information of the video signals. In this case, although the overall output declines in a dark scene, a high contrast ratio can be obtained. In a light scene, the luminance is maintained constant. Further, it is possible to avoid creating a sense of discomfort which would otherwise occur as a result of abrupt variations in luminance during transition from light to dark scenes, thus providing impressive images.

Further, in the above embodiment, a case was described in which the aperture stop device 108 is disposed between the first and second microlens arrays (MLAs) of the illumination optical device of the liquid crystal projector. However, the aperture stop device 108 may be disposed inside the projection optics 625.

Still further, in the above embodiment, a case was described in which preset aperture operation times for light and dark adaptations are selected from a list in the iris response menu. However, desired aperture operation times for light and dark adaptations may be set by entering data for the operation times from the menu.

Still further, in the above embodiment, a case was described in which aperture adjustment mode and aperture response characteristic are selected by users according to the content to be viewed. However, aperture adjustment mode and aperture response characteristic may be selected by the CPU 111 based on content identification information such as program type information.

It should be understood by those skilled in the art that various modifications, combinations, sub-combinations and alterations may occur depending on design requirements and other factors insofar as they are within the scope of the appended claims or the equivalents thereof.

What is claimed is:
1. A display apparatus comprising:
a variable aperture stop device that adjusts a lens opening size by opening and closing an aperture;
a control circuit that controls opening and closing of the aperture based on an aperture ratio for brightness distribution of an input signal constituting a screen; and
a user interface that permits setting of an iris response for determining a speed of opening and closing of the aperture, wherein
the control circuit controls opening and closing of the aperture based on the iris response set via the user interface, the iris response being different between when the input signal changes from dark to light levels and when the input signal changes from light to dark levels.
2. The display apparatus of claim 1,
wherein the user interface permits selection of one of a plurality of modes with different variable ranges of the aperture.
3. The display apparatus of claim 2, wherein
the user interface permits setting of the iris response in a selected mode.
4. The display apparatus of claim 1, wherein
the control circuit samples the brightness distribution of pixels of the input signal at a plurality of points and detects, as a point X, a point at the luminance level occupying an area of the brightness distribution which accounts for a preset ratio to an area occupied by total pixel count, and the control circuit controls opening and closing of the aperture based on an aperture ratio for the detected point X.
5. The display apparatus of claim 4, wherein
the iris response is faster when the input signal changes from dark to light levels than when the input signal changes from light to dark levels.
6. A display apparatus comprising:
a variable aperture stop device that adjusts a lens opening size by opening and closing an aperture;
a control circuit that controls opening and closing of the aperture based on an aperture ratio for brightness distribution of an input signal constituting a screen;

a user interface that permits setting of an iris response for determining a speed of opening and closing of the aperture; and a signal correction unit capable of correcting a gain of a signal adapted to drive an image to be displayed, wherein the control circuit controls opening and closing of the aperture based on the iris response set via the user interface, the iris response being different between when the input signal changes from dark to light levels and when the input signal changes from light to dark levels, and wherein the control circuit corrects the gain in accordance with the aperture opening and closing control using the signal correction unit.

7. The display apparatus of claim 6,
wherein the user interface permits selection of one of a plurality of modes with different variable ranges of the aperture.

8. The display apparatus of claim 6, wherein
the control circuit samples the brightness distribution of pixels of the input signal at a plurality of points and detects, as a point X, a point at the luminance level occupying an area of the brightness distribution which accounts for a preset ratio to an area occupied by total pixel count,
the control circuit controls the opening and closing of the aperture based on an aperture ratio for the detected point X, and
the control circuit corrects the gain based on data for the point X using the signal correction unit.

9. The display apparatus of claim 7, wherein
the user interface permits setting of the iris response in a selected mode.

10. The display apparatus of claim 8, wherein
the data for the point X is data obtained from a characteristic curve for the point X among characteristic curves of gains set according to the number of sampling points of the control circuit set between minimum and maximum gains.

11. The display apparatus of claim 10, wherein
the iris response is faster when the input signal changes from dark to light levels than when the input signal changes from light to dark levels.

12. The display apparatus of claim 11, wherein
the data for the point X is data obtained from a characteristic curve for the point X among characteristic curves of gains set according to the number of sampling points of the control circuit set between minimum and maximum gains.

13. A display apparatus comprising:
a variable aperture stop device that adjusts a lens opening size by opening and closing an aperture;
a control circuit that samples a brightness distribution of pixels of an input signal at a plurality of points and detects, as a point X, a point at the luminance level occupying an area of the brightness distribution which accounts for a preset ratio to an area occupied by total pixel count;
a signal correction unit capable of correcting a gain of a signal adapted to drive an image to be displayed; and
the control circuit controls opening and closing of the aperture based on an aperture ratio for the detected point X and corrects the gain based on data for the point X using the signal correction unit, wherein
the control circuit controls opening and closing of the aperture based on a preset iris response for determining a speed of opening and closing of the aperture, the iris response being different between when the input signal changes from dark to light levels and when the input signal changes from light to dark levels, and wherein the control circuit corrects the gain in accordance with the aperture opening and closing control using the signal correction unit.

14. A display apparatus comprising:
an optical modulation unit that modulates an incident illumination beam based on an input image signal and emit a modulated beam;
a variable aperture stop device that opens and closes in a concentric manner relative to the optical axis of the modulated beam from the optical modulation unit so as to adjust the amount of the incident illumination beam upon the optical modulation unit based on a control signal;
a control circuit opening and closing of the variable aperture stop device based on an aperture ratio for brightness distribution of the input image signal constituting a screen; and
a user interface that permits setting of an iris response for determining a speed of opening and closing of the variable aperture stop device, wherein
the control circuit controls opening and closing of the variable aperture stop device based on the iris response set via the user interface, the iris response being different between when the input image signal changes from dark to light levels and when the input image signal changes from light to dark levels.

15. A display apparatus comprising:
an optical modulation unit that modulates an incident illumination beam based on an input image signal and emits a modulated beam;
a variable aperture stop device that opens and closes in a concentric manner relative to the optical axis of the modulated beam from the optical modulation unit so as to adjust the amount of the incident illumination beam upon the optical modulation unit based on a control signal;
a control circuit that control opening and closing of the variable aperture stop device based on an aperture ratio for brightness distribution of the input image signal constituting a screen;
a user interface that permits setting of an iris response for determining a speed of opening and closing of the variable aperture stop device; and
a signal correction unit capable of correcting a gain of a signal adapted to drive an image to be displayed, wherein
the control circuit controls opening and closing of the variable aperture stop device based on the iris response set via the user interface, the iris response to being different between when the input image signal changes from dark to light levels and when the input image signal changes from light to dark levels, and wherein
the control circuit corrects the gain in accordance with the aperture opening and closing control using the signal correction unit.

16. A display apparatus comprising:
an optical modulation unit that modulates an incident illumination beam based on an input image signal and emits a modulated beam;
a variable aperture stop device that opens and closes in a concentric manner relative to the optical axis of the modulated beam from the optical modulation unit so as to adjust the amount of the incident illumination beam upon the optical modulation unit based on a control signal;

a control circuit that samples a brightness distribution of pixels of the input image signal at a plurality of points and detect, as a point X, a point at the luminance level occupying an area of the brightness distribution which accounts for a preset ratio to an area occupied by total pixel count; and a signal correction unit capable of correcting a gain of a signal adapted to drive an image to be displayed, wherein the control circuit controls opening and closing of the variable aperture stop device based on an aperture ratio for the detected point X and correct the gain based on data for the point X using the signal correction unit, wherein the control circuit controls opening and closing of the variable aperture stop device based on a preset iris response for determining a speed of opening and closing of the variable aperture stop device, the iris response being different between when the input image signal changes from dark to light levels and when the input image signal changes from light to dark levels, and wherein the control circuit corrects the gain in accordance with the aperture opening and closing control using the signal correction unit.

17. A driving method of a display apparatus having a variable aperture stop device, the driving method comprising:

setting an iris response for determining a speed of opening and closing of the variable aperture stop device via a user interface;

acquiring a brightness distribution of an input signal constituting a screen;

controlling opening and closing of the variable aperture stop device based on the iris response set via the user interface, the iris response being different between when the input signal changes from dark to light levels and when the input signal changes from light to dark levels; and correcting a gain of a signal adapted to drive an image to be displayed in accordance with the aperture opening and closing control.

* * * * *